US00RE36950E

United States Patent [19]

Allen

[11] E Patent Number: Re. 36,950

[45] Reissued Date of Patent: Nov. 7, 2000

[54] GOLF CLUB HEAD WITH INCREASED RADIUS OF GYRATION AND FACE REINFORCEMENT

[75] Inventor: Dillis V. Allen, Elk Grove Village, Ill.

[73] Assignee: Vardon Golf Company, Inc., Elk Grove, Ill.

[21] Appl. No.: 08/880,748

[22] Filed: Jun. 23, 1997

Related U.S. Patent Documents

Reissue of:

[64] Patent No.: 5,301,941
Issued: Apr. 12, 1994
Appl. No.: 07/882,561
Filed: May 13, 1992

U.S. Applications:

[63] Continuation of application No. 08/369,910, Jan. 9, 1995, abandoned.

[51] Int. Cl.[7] ..... A63B 53/02; A63B 53/04; B22D 19/00

[52] U.S. Cl. ..... 473/314; 473/332; 473/345; 473/349; 473/409; 164/34; 164/98; 164/361

[58] Field of Search ..... 473/305, 306, 473/307, 308, 309, 310, 311, 312, 314, 324, 329, 330–344, 345, 346, 349, 350, 409; D21/733–752; 164/34, 98, 361

[56] References Cited

U.S. PATENT DOCUMENTS

| | | |
|---|---|---|
| D. 229,431 | 11/1973 | Baker . |
| D. 318,703 | 7/1991 | Shearer . |
| 572,436 | 12/1896 | Mills . |
| 723,534 | 3/1903 | Knight . |
| 922,444 | 5/1909 | Youds . |
| 1,459,810 | 6/1923 | Wills . |
| 1,568,888 | 1/1926 | Dunn . |
| 1,587,758 | 6/1926 | Caaravay . |

(List continued on next page.)

FOREIGN PATENT DOCUMENTS

| | | |
|---|---|---|
| 211781 | 12/1957 | Australia . |
| 0049130 | 4/1977 | Japan . |
| 10187 | of 1893 | United Kingdom . |
| 6385 | of 1893 | United Kingdom . |
| 8954 | of 1893 | United Kingdom . |
| 9514 | of 1898 | United Kingdom . |
| 15 597 | of 1904 | United Kingdom . |
| 876414 | 8/1961 | United Kingdom . |
| 2109249 | 6/1983 | United Kingdom . |

OTHER PUBLICATIONS

Exhibit B presenting the Barber Irons, 1984–1987, 4 pages.

*Primary Examiner*—Sebastiano Passaniti
*Attorney, Agent, or Firm*—Dillis V. Allen, Esq.

[57] ABSTRACT

An improved high impact metal clubhead with a unique reinforced composite face wall, increased radius of gyration, and a positive lift air foil surface contour. The composite face wall includes an impact supporting wall rigidified by a pattern of integrally cast reinforcing bars that extend forwardly, rather than rearwardly, from the supporting wall. The reinforced supporting wall is covered by a very hard plastic ball striking insert that is cast in situ over the supporting wall. The increase in radius of gyration is accomplished by extending the heel and toe portions of the clubhead along the face wall further from the geometric center of the head, beyond present day parameters for high impact clubheads. And the positive lift is effected by contouring the top wall of the clubhead downwardly and rearwardly from the base wall more severely almost to the plane of the sole plate, and flattening the rear wall so it is almost co-planar with the sole plate. This configuration results in the top wall being equal to or greater in length than the combined length of the sole plate and rear wall in a vertical plane extending through the clubhead along the target line. The laws of continuity of matter and the air foil shape of the top wall eliminate the negative lift or drag in today's "woods" and offer the possibility of some positive lift to increase ball overspin.

22 Claims, 4 Drawing Sheets

U.S. PATENT DOCUMENTS

| | | |
|---|---|---|
| 1,678,637 | 7/1928 | Drevitson . |
| 1,683,639 | 9/1928 | Vaile . |
| 2,083,189 | 6/1937 | Crooker . |
| 2,429,351 | 10/1947 | Fetterolf . |
| 3,077,350 | 2/1963 | Koorland . |
| 3,640,534 | 2/1972 | Mills . |
| 3,652,093 | 3/1972 | Reuter . |
| 3,819,181 | 6/1974 | Mills . |
| 3,847,399 | 11/1974 | Raymont . |
| 3,873,094 | 3/1975 | Sebo et al. . |
| 3,947,041 | 3/1976 | Barber . |
| 4,076,254 | 2/1978 | Nygren . |
| 4,679,792 | 7/1987 | Straza et al. . |
| 4,681,322 | 7/1987 | Straza et al. . |
| 4,730,830 | 3/1988 | Tilley et al. . |
| 4,930,781 | 6/1990 | Allen . |
| 5,042,806 | 8/1991 | Helmstetter . |
| 5,060,951 | 10/1991 | Allen . |

GOLF CLUB HEAD WITH INCREASED RADIUS OF GYRATION AND FACE REINFORCEMENT

Matter enclosed in heavy brackets [ ] appears in the original patent but forms no part of this reissue specification; matter printed in italics indicates the additions made by reissue.

*This application is a continuation of reissue application Ser. No. 08/369,910, filed Jan. 09, 1995, now abandoned, which is a reissue of application Ser. No. 07/882,561, filed May 13, 1992, now U.S. Pat. No. 5,301,941.*

BACKGROUND OF THE INVENTION

Investment casting techniques innovated in the late 1960s have revolutionized the design, construction and performance of golf clubheads up to the present time Initially only novelty putters and irons were investment cast, and it was only until the early years of the 1980s that investment cast metal woods achieved any degree of commercial success. The initial iron clubheads that were investment cast in the very late 1960s and early 1970s innovated the cavity backed clubheads made possible by investment casting which enabled the molder and tool designer to form rather severe surface changes in the tooling that were not possible in prior manufacturing techniques for irons which were predominantly at that time forgings. The forging technology was expensive because of the repetition of forging impacts and the necessity for progressive tooling that rendered the forging process considerably more expensive than the investment casting process and that distinction is true today although there have been recent techniques in forging technology to increase the severity of surface contours able them at considerable expense.

The investment casting process, sometimes known as the lost wax process, permits the casting of complex shapes found beneficial in golf club technology, because the ceramic material of the mold is formed by dipping a wax master impression repeatedly into a ceramic slurry with drying periods in-between and with a silica coating that permits undercutting and abrupt surface changes almost without limitation since the wax is melted from the interior of the ceramic mold after complete hardening.

This process was adopted in the 1980s to manufacture "wooden" clubheads and was found particularly successful because the construction of these heads requires interior undercuts and thin walls because of their stainless steel construction. The metal wood clubhead, in order to conform to commonly acceptable clubhead weights on the order of 195 to 210 grams when constructed of stainless steel, must have extremely thin wall thicknesses on the order of 0.020 to 0.070 inches on the perimeter walls to a maximum of 0.125 inches on the forward wall which is the ball striking surface. This ball striking surface, even utilizing a high strength stainless steel such as 17-4, without reinforcement, must have a thickness of at least 0.125 inches to maintain its structural integrity for the high clubhead speed player of today who not uncommonly has speeds in the range of 100 to 150 feet per second at ball impact.

Faced with this dilemma of manufacturing a clubhead of adequate strength while limiting the weight of the clubhead in a driving metal wood in the range of 195 to 210 grams, designers have found it difficult to increase the perimeter weighting effect of the clubhead.

In an iron club, perimeter weighting is an easier task because for a given swing weight, iron clubheads can be considerably heavier than metal woods because the iron shafts are shorter. So attempts to increase perimeter weighting over the past decade has been more successful in irons than "wooden" clubheads. Since the innovation of investment casting in iron technology in the late 1960s, this technique has been utilized to increase the perimeter weighting of the clubhead or more particularly a redistribution of the weight of the head itself away from the hitting area to the perimeter around the hitting area, usually by providing a perimeter wall extending rearwardly from the face that results in a rear cavity behind the ball striking area. Such a clubhead configuration has been found over the last two plus decades to enable the average golfer, as well as the professional, to realize a more forgiving hitting area and by that we mean that somewhat off-enter hits from the geometric face of the club results in shots substantially the same as those hits on the geometric center of the club. Today it is not uncommon to find a majority of professional golfers playing in any tournament with investment cast perimeter weighted irons confirming the validity of this perimeter weighting technology.

Metal woods by definition are perimeter weighted because in order to achieve the weight limitation of the clubhead described above with stainless steel materials, it is necessary to construct the walls of the clubhead very thin which necessarily produces a shell-type construction where the rearwardly extending wall extends from the perimeter of the forward ball striking wall, and this results in an inherently perimeter weighted club, not by design but by a logical requirement.

In the Raymont, U.S. Pat. No. 3,847,399 issued Nov. 12, 1974, assigned to the assignee of the present invention, a system is disclosed for increasing the perimeter weighting effect of a golf club by a pattern of reinforcing elements in the ball striking area that permits the ball striking area to be lighter than normal, enabling the designer to utilize that weight saved on the forward face by adding it to the perimeter wall and thereby enhancing perimeter weighting.

This technique devised by Mr. Raymont was adopted in the late 1980s by many tool designers of investment cast metal woods to increase the strength of the forward face of the metal woods to maintain the requirement for total overall head weight and to redistribute the weight to the relatively thin investment cast perimeter walls permitting these walls to not only have greater structural integrity and provide easier molding and less rejects, but also to enhance the perimeter weighting of these metal woods. Most major companies in the golf industry manufacturing metal woods in the late 1980s were licensed under the Raymont patent.

In 1991, the Allen. U.S. Pat. No. 5,060,951 issued entitled "Metal Headed Golf Club With Enlarged Face", also assigned to the assignee of the present invention, and it discloses an investment cast metal wood with an enlarged club face depth (height) on the order of at least 1.625 inches. Such a face depth was not formerly believed possible because of the requirement for face structural integrity under the high impact loads at 100 to 150 feet per second, and the weight requirements of the clubhead of 195 to 210 grams. In this Allen patent, a labyrinth of reinforcing elements similar to Mr. Raymont's was utilized not to re-distribute face weight but instead to enlarge face area while maintaining overall clubhead weight. An ancillary and important advantage of this development, utilized by many present day designers of "jumbo" metal wood heads, is the fact that an enlarged club face produces a sweet spot enlargement far greater than the enlargement of the club face itself.

There are however limitations on the effectiveness of the reinforcing elements on the face wall of investment cast clubs and particularly metal woods. Because investment cast metal woods must have hollow interiors, these interiors must be formed by removable core pieces. To the present day face wall reinforcement has been effected in accordance with the above Raymont and Allen patents by forming integral ribs and bars on the rear surface of the forward ball striking wall. In order to effect this rib pattern, the core pieces that form the rear surface of the ball striking wall, as well as the ribs themselves, must be withdrawn rearwardly in order to clear the ribs. However, the perimeter wall extending rearwardly from the forward wall inhibits the direct rearward removal of these core pieces from the forward wall during the casting operation. Therefore, it has been commonplace to either make these reinforcing elements very shallow on the order of 0.030 to 0.050 inches in rearward depth or to rearwardly taper the ribs almost to a point extending rearwardly from the forward face so that these core pieces can move laterally somewhat as they are removed from the forward wall at the completion of the casting cycle.

These limitations detract from the effectiveness of the reinforcing elements and their capability of achieving a lighter front ball striking wall. As described in the Raymont patent, the effectiveness of the reinforcement of the forward wall is determined by the "I" or "T" beam configuration of the reinforcing elements. The amount of reinforcement is determined in part by the depth and width of the reinforcing walls in a plane transverse of the ball striking wall at its point furthest from the ball striking wall. In an "I" beam configuration, the width of the cross piece away from the forward wall, can be selected as desired but is extremely difficult to mold because of the undercut on the rear web. Such increase in web width and augmentation of the depth of the reinforcement has not to this date been possible prior to the present invention, and hence the full advantages of increased perimeter weighting, superior face reinforcement, and face enlargement have not been thus far fully exploited.

Another problem addressed by the present invention is the achievement of increasing the benefits of perimeter weighting by simply adding weight to the perimeter of the clubhead itself. This technique of course has found considerable success in low impact clubheads such as putters, where overall clubhead weight is in no way critical, and in fact in many low impact clubs that have found considerable commercial success, the clubheads weigh many times that of metal wood heads, sometimes three or four times as heavy.

To this date, however, increased perimeter weighting has not been found easy because of the weight and impact strength requirements in metal woods. An understanding of perimeter weighting must necessarily include a discussion of the parameter radius of gyration. The radius of gyration in a golf clubhead is defined as the radius from the geometric or ball striking axis of the club along the club face to points of clubhead mass under consideration. Thus in effect the radius of gyration is the moment arm or torquing arm for a given mass under consideration about the ball striking point. The total moments acting on the ball during impact is defined as the sum of the individual masses multiplied by their moment arms or radii of gyration. And this sum of the moments can be increased then by either increasing the length of the individual moment arms or by increasing the mass or force acting at that moment arm or combinations of the two.

Since it is not practical, except for the techniques discussed in the above Raymont and Allen patents, to add weight to the perimeter wall because or the weight limitations of metal woods and particularly the driving woods, one alternative is to increase the moment arm or radius of gyration. This explains the popularity of today's "jumbo" woods although many of such woods do not have enlarged faces because of the requirement for structural integrity in the front face.

Another problem arises from the aerodynamics of today's metal woods as well as those of the "wooden" type. The top wall in many metal and wooden woods has an aerodynamic shape but due lo the configuration of the sole plate and the back wall, there is no possible air foil lift generated in the normal clubhead impact speed range of 100 to 150 feet per second. In fact, there can be a negative lift or downward drag on the clubhead as the head moves through the hitting area due to the fact that the length of the air stream passing under the clubhead is greater than the length of the air stream passing over the top wall because the sum of the length of the sole plate and back wall in a vertical plane passing down the target line through the clubhead is greater than the length of the top wall in the same plane. Applying the law of continuity to these parameters results in the air stream along the bottom of the clubhead having a lower pressure than the air stream passing along the top of the clubhead and hence a resulting downward force on the clubhead as it passes through the hitting area at high speed.

It is a plurality object of the present invention to ameliorate the problems of interior face reinforcement, increasing the radius of gyration, and improving the aerodynamic characteristics of a high impact golf clubhead.

SUMMARY OF THE PRESENT INVENTION

In accordance with the present invention, an improved high impact metal clubhead is provided with a unique composite face wall, increased radius of gyration, and a positive lift air foil contour.

Toward these ends, the composite face wall includes an impact supporting wall that is investment cast with the remainder of the head(without the sole plate which is a separate piece as cast). This impact supporting wall is rigidified by a pattern of integrally cast reinforcing bars that extend forwardly from the forward wall rather than rearwardly as described in the above discussed Raymont and Allen patents. This reinforcing pattern has a depth of approximately 0.150 inches which is significantly greater than reinforcing patterns possible on the rear of the ball striking faces of prior constructions. This increased depth provides far greater supporting wall reinforcement. It is also easily cast because the core piece that forms these deep depth reinforcing elements are removed by a direct forward withdrawal unencumbered by the perimeter wall that inhibits rearward core withdrawal inside the clubhead. In the exemplary embodiment of this pattern of reinforcing bars, the reinforcing bars are formed into hexagonal unit cells having a major diameter of 0.500 inches, although other geometric patterns are within the scope of the present invention.

This reinforced supporting wall is covered by a very hard plastic ball striking insert that is cast in situ(in place) over the supporting wall. That is, after the head is investment cast, the forward wall is cleaned and vulcanized with a bonding agent and placed in a mold that carries the configuration of the outer surface of the insert and an elastomeric material is either poured or injected under pressure into the mold to form the insert. One material that has been found successful is a Shore D 75 hardness polyurethane, which results in a very hard high frequency ball striking surface. This plastic insert, not only provides a very hard ball striking surface, but more importantly because it is intimately bonded to the forward wall and the reinforcing bars, it provides an effective "I" beam support with the bars for the forward wall as opposed to a "T" beam support found in today's rearwardly reinforced ball striking wall. It can be easily demonstrated by engineering calculation that I beam supports for transverse loads are substantially stronger than T beam supports.

The increase in the radius of gyration is accomplished by extending the heel and toe portions of the beyond present day parameters for high impact clubheads. These extensions provide greater effective heel and toe weighting. The heel of the clubhead is formed by extending the club face significantly beyond the hosel, that is, on the side of the hosel opposite the ball striking area, and extending the top wall and rear wall to accommodate this extended face. These extensions of the heel and toe are accomplished without any significant increase in overall clubhead weights, by extending the clubhead top wall downwardly almost to the plane of the sole plate, and flattening the rear wall almost to the plane of the sole plate. This design reduces perimeter wall and sole plate wall weight for a given size head and enables the saved weight to be positioned at the extended heel and toe portions of the clubhead.

Another advantage in the downward extension of the top wall and the flattening of the back wall almost to the plane of the sole plate is that at speeds normally encountered in ball driving; i.e., 100 to 150 feet per second, the resulting aerodynamic shape of the head eliminates the negative drag caused by present day clubhead designs as the clubhead passes through the hitting area. This is accomplished by firstly providing the top wall with a known airfoil shape in the vertical plane passing through the clubhead along the target line. Next, the clubhead back wall is flattened almost to the plane of the sole plate, and this results in the arc length of the top wall being somewhat greater than the arc length of the sum of the sole plate and back wall, all taken in that same vertical plane passing through the clubhead along the target line. Following known airfoil technology and the law of continuity of matter, this configuration results in the elimination of prior clubhead drag going through the ball striking area and in fact produces a slight upward force on the clubhead as it passes through the hitting area, and this effects ball overspin which is desirable in a driving club to produce increased total ball distance travel. Ball overspin of course causes the ball to roll further after it initially impacts with the ground.

Other objects and advantages of the present invention will appear more clearly from the following detailed description.

DETAILED DESCRIPTION OF THE PREFERRED EMBODIMENT

Figure 1:
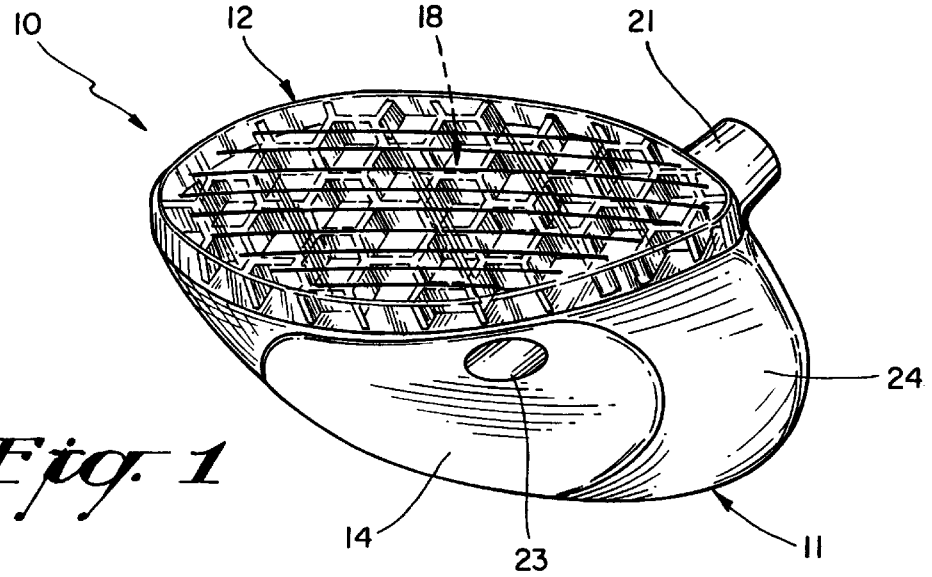
FIG. 1 is a bottom frontal perspective of a golf clubhead according to the present invention.
Figure 2:
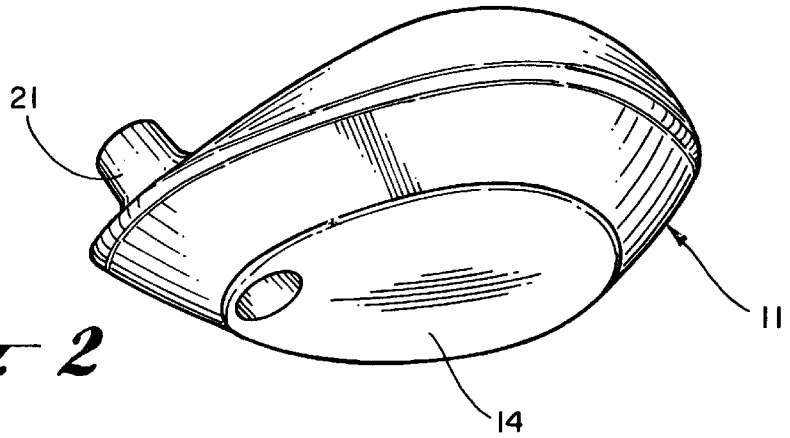
FIG. 2 is a bottom rear perspective of the golf clubhead illustrated in FIG. 1.
Figure 3:
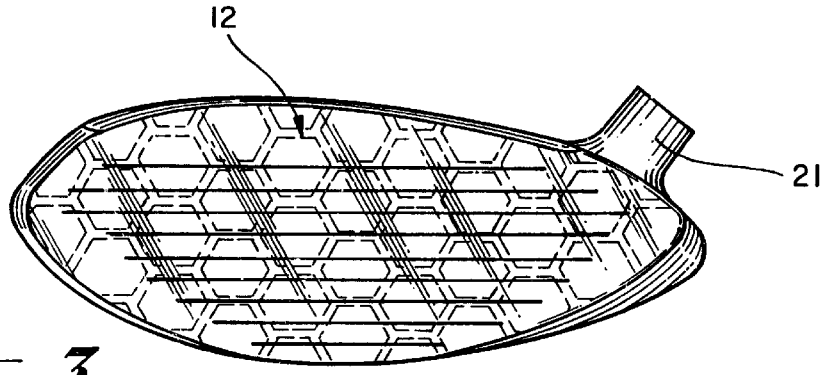
FIG. 3 is a front view of the golf clubhead illustrated in FIGS. 1 and 2.
Figure 4:
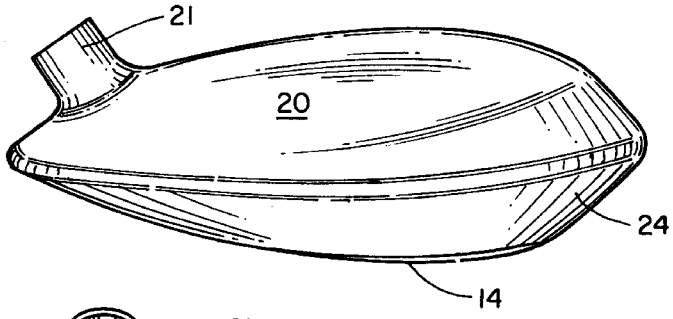
FIG. 4 is a rear view of the golf clubhead illustrated in FIG. 1.
Figure 5:
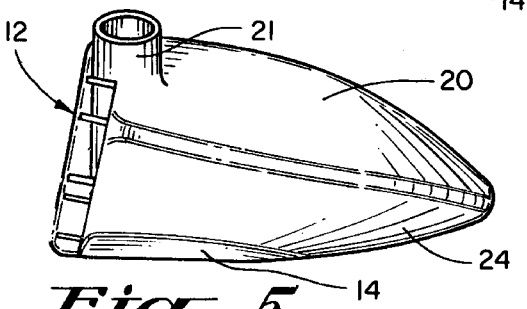
FIG. 5 is a right side view of the golf clubhead illustrated in FIG. 1.

Referring to the drawings and particularly FIGS. 1 to 8, a clubhead 10 is illustrated consisting of an investment cast clubhead body 12 with its forward wall covered by an in situ molded plastic insert 12 thereover.

The clubhead 10 is preferably a thin walled investment cast head constructed of a high strength metal alloy such as 17-4 stainless steel or a high titanium content alloy with aluminum but certain aspects of the present invention can be utilized in clubheads constructed of other materials. The clubhead 10 is a hollow casting that is enclosed by a sole plate 14 constructed of the same material as the clubhead body 11. Sole plate 14 is also investment cast and connected to the clubhead body 11 by heliarc welding around its perimeter. The investment casting techniques for the clubhead body 11, the sole plate 14, and the welding of the sole plate 14 to the body 11 have been well known for at least the past eight years although the unique shape of the clubhead body 11 requires some modification in the shape of the internal core pieces that form the shell of the body, but this presents no difficult molding problems particularly because the rear of the integral forward wall of the body 11 has no reinforcement that requires difficult core pulling.

The forward face of the forward wall 16 of the body 11 is integrally cast with the body 11 and it has a unit-cell pattern 18 that projects forwardly from wall 16 that supports, rigidifies and reinforces the forward wall 16.

The plastic insert 12 may be either cast over forward wall 16 or molded in a pressure molding cycle. The material selected for insert 12 is an extremely high impact, durable and hard material, such as found in the thermosetting elastomeric materials, which of course require a catalyst for polymerization. Insert 12 is translucent so the unit-cell structure 18 can be viewed when the clubhead is assembled.

There are epoxies that will work adequately. However, the Shore D 50 to 75 durometer urethanes have been found to be superior to the epoxies and one such urethane is Andur®[1] 17500-DP manufactured by Anderson Development Company of Adrian, Mich. Other manufacturers of similar urethane products include American Cyanimide Corp., Mobay Chemical Company and Uniroyal Chemical Company.

[1] Andur® is a registered trademark of Anderson Development Company.

Figure 6:
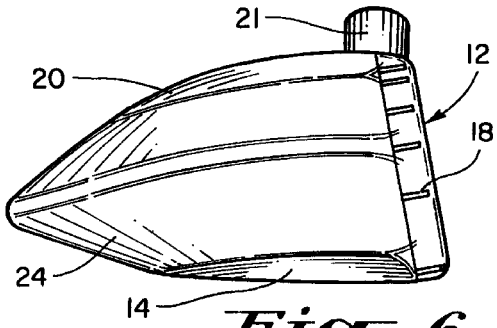
FIG. 6 is a left side view of the golf clubhead illustrated in FIG. 1.
Figure 7:
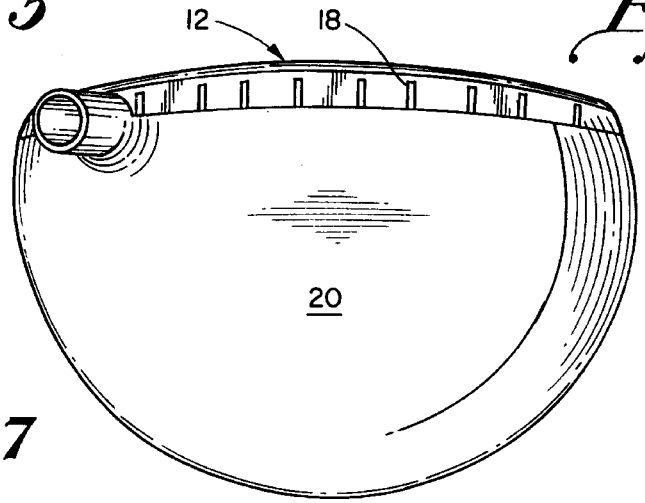
FIG. 7 is a top view of the golf clubhead illustrated in FIG. 1.
Figure 8:
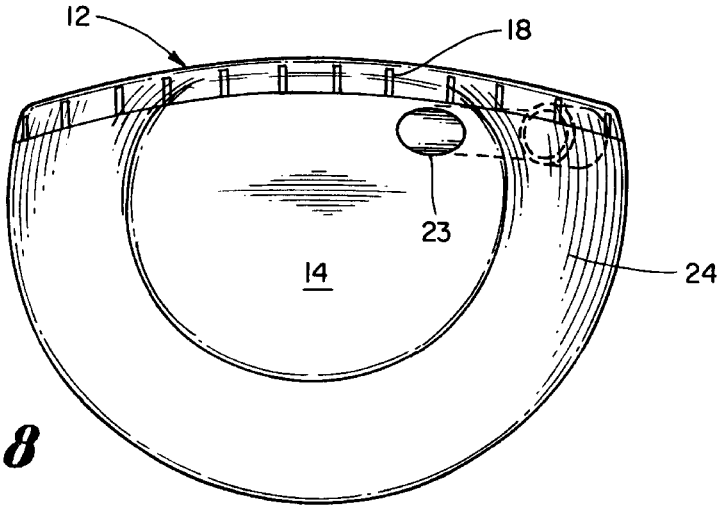
FIG. 8 is a bottom view of the golf clubhead illustrated in FIG. 1.
Figure 11:
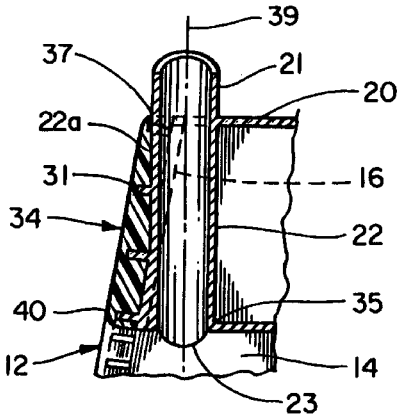
FIG. 11 is a fragmentary section illustrating the hosel in its relationship to the front supporting wall taken generally along line 11—11 of FIG. 9.

The clubhead body 11 is a single casting and in addition to the front or forward supporting wall 16 and the hexagonal unit cell structure 18 includes a top wall 20 from which a short hosel portion 21 projects, and as seen in FIG. 11, hosel portion 21 is part of a tubular hosel 22 that extends completely through the body 11 and connects to an opening 23 in sole plate 14 during assembly. The body 11 is completed by a rear wall 24 that angles upwardly from the sole plate as seen in FIG. 6 in a vertical plane bisecting the clubhead 10 along the target line at an angle of less than 20 degrees.

Figure 10:
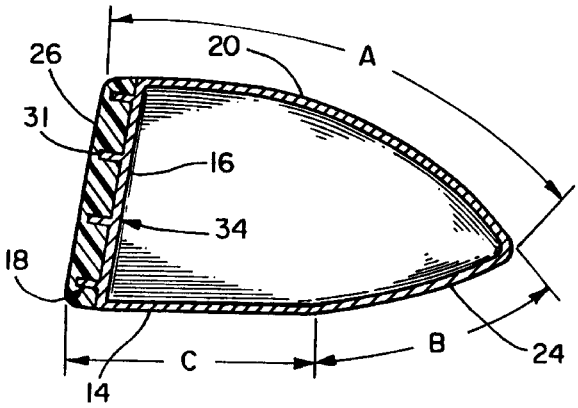
FIG. 10 is a longitudinal section taken generally along line 10—10 of FIG. 9.

As seen in FIG. 10, which is a longitudinal section taken in a vertical plane extending along the target line at the geometric center of the club face, the distance A, which is the distance from the plane of the ball striking surface 26 to the rear of the club, is slightly greater than the sum of the distances B and C, which is the distance from the plane of the ball striking surface 26 to the rear of the club along the sole plate 14 and the rear wall 24. Top wall 20 has a standard airfoil section, and one found acceptable is airfoil section NACA 16-510, and the relationship between the distances of A, B and C eliminate downward air foil drag on the clubhead through impact and in fact create a slight upward lift.

Figure 13:
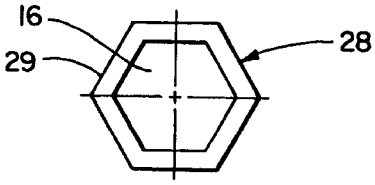
FIGS. 13 and 14 are enlarged front and side views of one of the hexagonal cells that support the forward wall of the club face.
Figure 14:
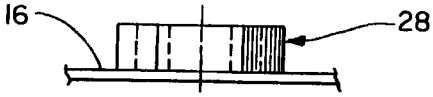

As noted above the hexagonal unit-cell structure 18 is integrally cast with the forward wall 16 and includes approximately four horizontally staggered hexagonal cell rows and ten plus vertical rows. An exemplary cell 28 is illustrated in FIGS. 13 and 14 at a scale approximately twice that illustrated in the other FIGS. Each cell is seen to include six wall segments 29 each having a height from the forward surface of wall 16 of 0.150 inches, with a wall thickness of 0.0625, and the minor diameter $D_m$ of the cell is 0.500 inches. The height of the unit-cell structure 16, and thus of course the height of the ball striking surface 26, $H_f$ as shown in FIG. 10, is at least 1.625 inches, and in that respect it conforms to the geometry of the enlarged club face head shown and described in connection with the above-noted Allen, U.S. Pat. No. 5,060,951.

The thickness of wall 16 is 0.070 inches which, as will be appreciated by those with skill in the art, is not by itself thick enough to provide the sole load supporting element in the face. However, when reinforced by the deep depth honeycomb unit-cell structure 18, and the urethane insert 12, the resulting composite wall is far stronger than in any known metallic clubhead conforming to standard weight requirements.

The insert 12 has a depth from its forward surface 26 to the forward surface of the face wall 16 of 0.200 inches so that the insert projects forwardly from the forward surface 31 of the unit-cell structure 18 a distance of 0.050 inches, all resulting in a total composite forward wall thickness of 0.270 inches. Obviously if one were to construct a forward wall with a thickness of 0.270 inches in stainless steel, the resulting clubhead weight would be prohibitively high, but the resulting composite wall designated by reference numeral 34 in FIGS. 10 and 11, has the same weight as an equivalently sized stainless steel wall at 0.125 inches in thickness. The 0.125 inch forward wall is the minimum thickness forward wall in an investment cast 174 stainless steel clubhead that has the necessary structural integrity to withstand the ball impact forces generated at clubhead speeds in the range of 100 to 150 feet per second, while at the same time maintaining overall clubhead weight.

Figure 12:
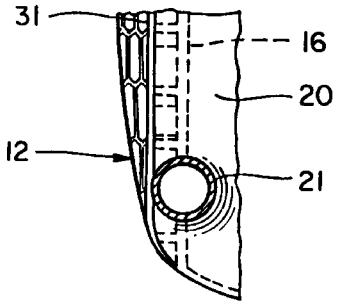
FIG. 12 is a fragmentary section taken generally along line 12—12 of FIG. 9.

As seen in FIGS. 11 and 12, the hosel tube 22 extends completely through the body It and is welded at 35 around sole plate opening 23. Note that a major portion 22*a* of the hosel 22(see FIG. 9) projects through the forward wall 16 and because the hosel 22 is fixed to the top wall at its upper end and the sole plate 14 at its lower end, it provides a very effective supporting strut for forward wall 16 and in fact rigidifies and strengthens forward wall 16 with the honeycomb unit-cell structure 18.

As seen in FIG. 11, face progression is determined by locating the forward surface or the hosel tube 22 at point 37 at the top of the clubhead flush in a vertical plane with the outer surface 31 of the unit-cell structure 18. The ball striking surface 26 however, is 0.050 inches outwardly therefrom at point 37 because plastic insert 12 covers the outer surface 31 of the unit-cell structure by 0.050 inches. Note in the drawings the ball striking race 26, the forward surface 31 of the unit-cell structure 18, and the integral supporting wall 16 all have a loft angle of 10 degrees. This geometry establishes the face progression which is defined in the at as the distance between axis 39 of the hosel shaft to the leading edge 40 of club face 26 In the plane of FIG. 11.

Figure 9:
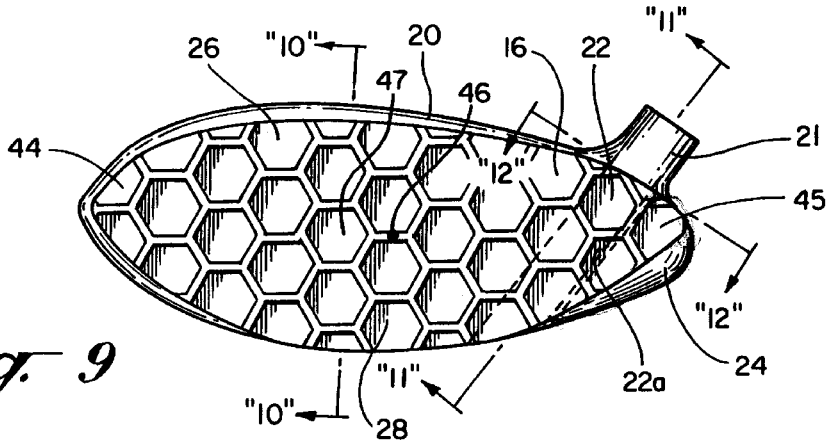
FIG. 9 is a front view of the golf clubhead without the plastic insert and with the honeycombing partly fragmented.

An important aspect of the present invention is that toe portion 44 and clubbead heel portion 45 are in combination further from the geometric center 46 of the clubhead than in standard metal woods, even the "jumbo" style metal woods popular today. Toe portion 44 is 2.062 inches from center 46 and heel portion 45 is 2.062 inches from the same point. This is effected by elongating toe portion 44 and wrapping the top wall 20 and the rear wall 24 around the heel of the hosel tube 22 forming a face wall extension 26*a* as seen in FIG. 9, that is a substantial distance to the right of the hosel tube as seen in the frontal plane of FIG. 9. By locating the toe and heel portions 44 and 45 further from the geometric axis 46 of the clubhead, the radii of gyration of the clubhead about the ball impact point or the heel and toe are increased so the moments about the ball created by these heel and toe portions are proportionately increased. The heel portion 45 extends 0.562 inches from the axis 39 of the hosel in a direction perpendicular to that axis. The extended heel and toe portions 44 and 45 are effected without any significant increase in overall weight by flattening the rear wall 24 toward the plane of the sole plate 14 as seen in FIG. 6, and by the light weight composite forward face 34. An additional advantage in extending the heel 45 beyond the hosel tube 22 is that it reduces the golfer's tendency to slice, which is caused by the clubhead cutting across the target line from right lo left at impact.

This anti-slicing feature is enhanced in part because the changed geometry of the toe 44 and the heel 45 actually shifts the geometric center of the club face from point 47 to point 46 closer to the axis 39 of the club shaft.

Figure 15:
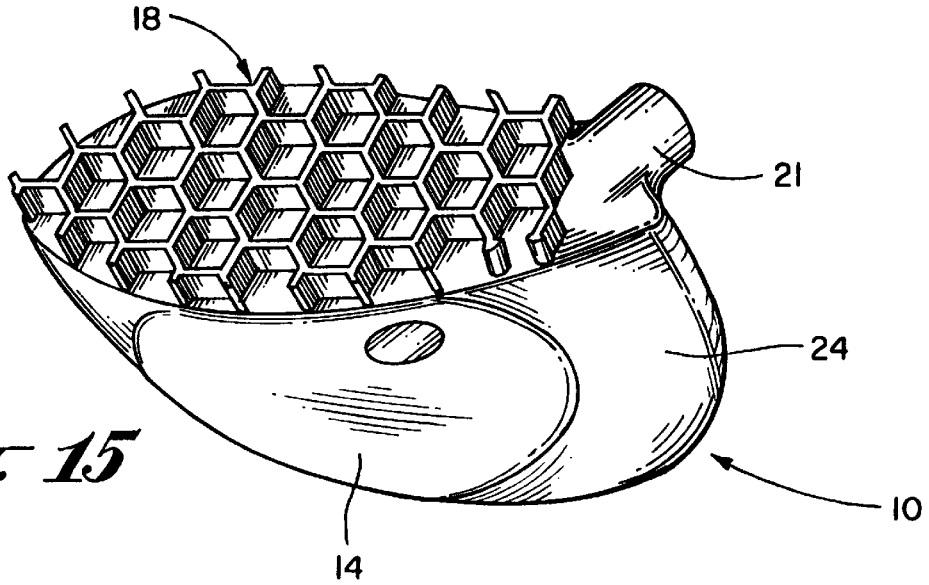
FIG. 15 is a perspective view, similar to FIG. 1, with the plastic insert removed.
Figure 16:
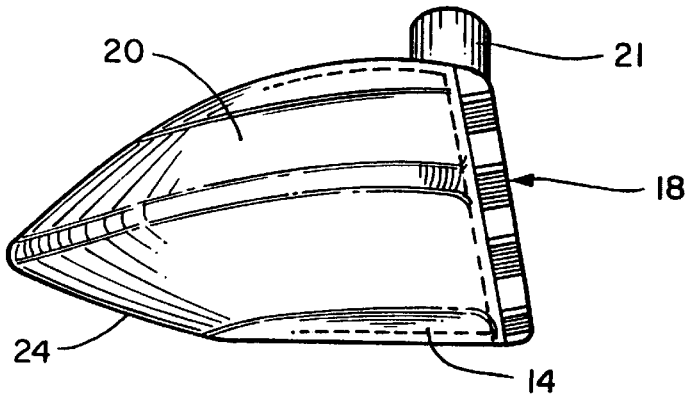
FIG. 16 is a left side view, similar to FIG. 6, with the plastic insert removed.

After the body 11 is investment cast and the sole plate 14 welded thereto, and the head is in its configuration illustrated in FIG. 15, the forward face of face wall 16 and the honeycomb unit-cell structure 18 is sandblasted and vulcanized with a suitable bonding agent. The clubhead is then placed and clamped into a mold having the geometry of the desired plastic insert 12 and the thermosetting material poured or injected into the mold, and then the mold and head are placed into an oven at approximately 310 degrees for 20 minutes depending upon the manufacturer's recommended polymerization parameters for the particular thermosetting elastomer utilized. And, after removing the composite clubhead from the mold, any flash can be removed in the final finishing operations.

I claim:

1. A [gold] *golf* club, comprising: a clubhead having a hosel receiving an elongated shaft, said clubhead being constructed of a metal alloy, said clubhead having a generally vertical impact supporting wall with a plurality of integral interconnected bars for reinforcing the impact supporting wall projecting forwardly from the impact supporting wall, said bars including a first plurality of bars intersected by a second plurality of bars forming a unit cell structure with a plurality of cells encapsulated by other cells, and a face wall defining a ball striking surface integrally bonded to and covering a forward surface of the impact supporting wall and at least portions of the integral reinforcing bars, said clubhead being [case] *cast* separately from the face wall.

2. A [gold] *golf* club, as defined in claim 1, wherein the face wall is constructed of a material easily moldable over the supporting wall and reinforcing bars.

3. A [gold] *golf* club, as defined in claim 1, wherein the club head is a composite high impact golf clubhead, wherein the reinforcing bars from part of an "I" beam supporting structure for a composite impact wall, said face wall being formed over the supporting wall and constructed of a different material therefrom having a forward ball striking surface that together with the supporting wall define a composite ball striking wall having increased strength and improved ball striking performance.

4. An investment cast metal clubhead, comprising: an investment cast metal clubhead having an integral forward wall and a generally cup-shaped rear wall surrounding a rear surface of the forward wall and extending only rearwardly therefrom, said forward wall and said rear wall each having interior surfaces meeting at a junction line and forming an included angle therebetween, said included angle being less than 90 degrees in at least certain portions of the interior surfaces rendering difficult the removal of core pieces from the hollow interior of the clubhead during the investment cast molding process, said forward wall having a plurality or integral reinforcing elements projecting forwardly therefrom, and a ball striking face wall situated over and in contact with the forward wall defining the ball striking surface, whereby difficult to remove interior core pieces are eliminated.

5. An investment cast metal clubhead, a defined in claim 3, wherein said ball striking face wall is formed over both the forward wall and at least portions of the reinforcing elements, said face wall having a forward ball striking surface with a plurality of ball spin producing grooves therein.

6. A golf club, comprising: a clubhead having a hosel receiving an elongated shaft, said clubhead being constructed of a metal alloy, said clubbead having a generally vertical impact supporting wall with a plurality of integral reinforcing bars projecting forwardly from the impact supporting face wall, and a face wall defining a ball striking surface integrally bonded to and covering a forward surface of the impact supporting face wall and at least portions of the integral reinforcing bars, said club head being a composite high impact golf clubbead, wherein the reinforcing bars form part of an "I" beam supporting structure for a composite impact wall, said face wall being formed over the supporting wall and constructed of a different material therefrom having a forward ball striking surface that together with the supporting wall define a composite ball striking wall having increased strength and improved ball striking performance, said reinforcing bars projecting from the supporting wall a distance less thin 0.250 inches, and said face wall being formed between the interstices of the reinforcing bars and engaging the supporting wall to form an effective "I" beam composite forward ball striking wall having improved strength and weight characteristics.

7. A golf club, comprising: a clubhead having a hosel receiving an elongated shaft, said clubhead being constructed of a metal alloy, said clubhead having a generally vertical impact supporting wall with a plurality of integral bars for reinforcing the impact supporting wall projecting forwardly from the impact supporting wall, and a face wall defining a ball striking surface of the impact supporting wall and covering at least portions of the integral reinforcing bars, sad clubhead being cast separately from the face wall, said face wall being a moldable face wall defining the ball striking surface covering and in contact with a forward surface of the impact supporting wall, said face wall being constructed of a material having a density substantially less than the density of the clubhead so the composite of the clubhead and the face wall are within the limits of acceptable club total weight and swing weight.

8. An investment cast metal clubhead, comprising: an investment cast clubhead having an integral forward wall and a generally cup-shaped rear wall surrounding a rear surface of the forward wall and extending only rearwardly therefrom, said forward wall and said rear wall each having interior surface meeting at a junction line and forming an included angle therebetween, said included angle being less than 90 degrees in at least certain portions of the interior surfaces thereof rendering difficult the removal of core pieces from the hallow interior of the clubhead during the investment cast molding process said forward wall having a plurality of integral reinforcing elements projecting forwardly therefrom, and a ball striking face wall situated over and in contact with the forward wall defining the ball striking surface, whereby difficult to remove interior core pieces are eliminated, said face wall being constructed of a material having a density substantially less than the density of the clubhead so the composite of the clubhead and the face wall is within the limits of acceptable club total weight and swing weigh.

9. A method of manufacturing a composite golf clubhead, including the steps of forming a metal clubhead having in impact absorbing generally vertical forward metal wall, forming a plurality of integral reinforcing elements on a forward surface of the impact wall, and thereafter attaching a ball impact insert means on the reinforcing elements in intimate contact with the reinforcing elements and the forward wall to achieve an effective "I" beam supporting system consisting of the base vertical wall, the reinforcing elements and the ball impact insert means, said ball impact insert means having a forward surface defining the ball striking surface.

10. A method of manufacturing a golf clubhead of composite materials as defined in claim 9, wherein the step of attaching a ball impact insert means over the impact wall includes molding in situ a plastic material over the forward wall and into the interstices defined by the reinforcing elements.

11. A method of manufacturing a golf clubhead of composite materials, including the steps or molding a metallic base with a generally vertical impact absorbing wall, forming a plurality of reinforcing bars on the impact absorbing wall projecting forwardly therefrom, placing a face mold over the impact absorbing wall, and molding, using the face mold on the impact wall, a material dissimilar to the base on the impact wall.

12. A high impact golf clubhead, comprising: a base including a high impact forward wall and a perimeter wall surrounding the forward wall and defining a hollow area generally centrally behind the forward wall, said forward wall having a ball impacting face [wall] with a plurality of generally parallel grooves therein, said ball impacting face having a vertical height of at least [1.4] *1.625* inches, said forward wall having a substantially uniform thickness inside the perimeter wall to reduce clubhead weight, said base having a shaft receiving hosel [therein] *thereon* having an axis that defines with a leading edge of the forward wall a face progression, and means to increase the radius of gyration of the base about a geometric impact center on the forward wall including an extension of the perimeter wall and the forward wall outwardly from the hosel in a direction away from the impact center on the forward wall and perpendicular to the target line, said extension of the forward wall and the perimeter wall not being greater than [0.625] *0.562* inches from the axis of the hosel in a direction perpendicular to the hosel axis.

13. A high impact golf clubhead, as defined in claim 12, wherein the forward wall is a forward generally vertical ball impact wall having a forward surface lofted to less than 15 degrees, said base perimeter wall surrounding the forward wall and extending rearwardly therefrom and converging rearwardly to envelope the forward wall and define a hollow interior in the base, said base hosel being angled to provide a lie for the base, said forward surface having a geometric center that defines the ball striking axis extending through the forward wall along the target line, said base perimeter wall including a bottom wall portion that extends outwardly from the hosel in a direction from the hosel axis opposite the target line, said perimeter wall including a top wall portion that meets and converges with the bottom wall portion in a direction from the hosel axis opposite the target line, whereby the forward wall extends a substantial distance from the hosel in a direction opposite the target line to increase the ball impact wall forward surface area.

14. A high impact golf clubhead as defined in claim 13, wherein the top wall portion and the bottom wall portion extend at least 0.500 inches from the axis of the hosel in a direction opposite the target line.

15. A high impact golf clubhead, comprising: a metallic body having a substantially flat ball striking wall on one side thereof angularly related to a vertical plane to provide clubhead loft, said ball striking wall having a plurality of generally parallel grooves therein and a face height of at least 1.40 inches, said [body] *ball striking* wall having a substantially uniform thickness, said [body] *ball striking* wall having a heel portion and a toe portion, said body having an integral hosel for receiving one end of a club shaft, means for perimeter weighting the body including an integral metallic perimeter wall surrounding at least a major portion of the [body] *ball striking* wall and extending rearwardly therefrom forming a cavity in the rear of the clubhead with a bottom defined by the back of the ball striking wall, and means for increasing the perimeter weighting of the clubhead including an extension of the heel portion of the [body] *ball striking* wall a substantial distance on the side of the hosel opposite the wall toe portion and perpendicular to the target line defining an extended heel portion and an extension of the perimeter wall around the perimeter of the extended heel portion of the ball striking wall, said hosel having an axis, said extension of the [body] *ball striking* wall and said extension of the perimeter wall not being greater than [0.625] *0.562* inches from the hosel axis in a direction perpendicular to the hosel axis.

16. A high impact golf clubhead as defined in claim 15, wherein the extended heel portion and the extended perimeter wall project at least 0.500 inches in a direction perpendicular to the axis of the hosel in a plane perpendicular to the target line.

17. A high impact golf clubhead as defined in claim 15, wherein the clubhead is a "wood" and the perimeter wall encloses the rear of the ball striking wall.

18. A high impact golf clubhead as defined in claim 15, wherein the ball striking wall has a loft of at least 9 degrees, perimeter weighting the body including an integral metallic perimeter wall surrounding at least a major portion of the ball striking wall and extending rearwardly therefrom forming a cavity in the rear of the clubhead with a bottom defined by the back of the ball striking wall, and means for increasing the perimeter weighting of the clubhead including an extension of the heel portion of the ball striking wall a substantial distance on the side of the hosel opposite the wall toe portion and perpendicular to the target line defining an extended heel portion and an extension of the perimeter wall around the perimeter of the extended heel portion of the ball striking wall, said hosel having an axis, said extension of the ball striking wall and said extension of the perimeter wall not being greater than 0.562 inches from the hosel axis in a direction perpendicular to the hosel axis.

*19. A high impact golf clubhead, comprising: a metallic body having a substantially flat ball striking wall on one side thereof angularly related to a vertical plane to provide clubhead loft, said ball striking wall having a plurality of generally parallel grooves therein and a face height of at least 1.40 inches, said ball striking wall having a substantially uniform thickness, said ball striking wall having a heel portion and a toe portion, said body having an integral hosel for receiving one end of a club shaft, means for perimeter weighting the body including an integral metallic perimeter wall surrounding at least a major portion of the ball striking wall and extending rearwardly therefrom forming a cavity in the rear of the clubhead with a bottom defined by the back of the ball striking wall, and means for increasing the perimeter weighting of the clubhead including an extension of the heel portion of the ball striking wall a substantial distance on the side of the hosel opposite the wall toe portion and perpendicular to the target line defining an extended heel portion and an extension of the perimeter wall around the perimeter of the extended heel portion of the ball striking wall, said hosel having an axis, said extension of the ball striking wall and said extension of the perimeter wall not being greater than about 0.562 inches from the hosel axis in a direction perpendicular to the hosel axis.*

*20. A high impact golf clubhead, comprising: a metallic body having a substantially flat ball striking wall on one side thereof angularly related to a vertical plane to provide clubhead loft, said ball striking wall having a plurality of generally parallel grooves therein and a face height of at least 1.40 inches, said ball striking wall having a substantially uniform thickness, said ball striking wall having a heel portion and a toe portion, said body having an integral hosel for receiving one end of a club shaft, means for perimeter weighting the body including an integral metallic perimeter wall surrounding at least a major portion of the ball striking wall and extending rearwardly therefrom forming a cavity in the rear of the clubhead with a bottom defined by the back of the ball striking wall, and means for increasing the perimeter weighting of the clubhead including an extension of the heel portion of the ball striking wall a substantial distance on the side of the hosel opposite the toe portion and perpendicular to the target line defining an extended heel portion and an extension of the perimeter wall around the perimeter of the extended heel portion of the ball striking wall, said hosel having an axis, said extension of the ball striking wall and said extension of the perimeter wall being about 0.500 inches from the hosel axis in a direction perpendicular to the hosel axis, said perimeter wall including a top wall portion, a bottom wall portion and a rear wall portion, said rear wall portion and the top wall portion converging at an acute angle to define a generally pointed heel tip.*

*21. A high impact golf clubhead, comprising: a base including a high impact forward wall and a perimeter wall*

*surrounding the forward wall with a center and defining a hollow area generally centrally behind the forward wall, said forward wall having a ball impacting face wall with a plurality of generally parallel grooves therein and a face height of at least 1.40 inches, said forward wall having a substantially uniform thickness inside the perimeter wall to reduce clubhead weight, said base having a shaft receiving hosel therein having an axis that defines with a leading edge of the forward wall a face progression, and means to reduce a tendency to slice the golf ball including a substantial extension of the perimeter wall and the forward wall outwardly from the hosel in a direction away from the impact center on the forward wall and perpendicular to the target line, said extension being about 0.500 inches.*

*22. A high impact golf clubhead comprising: a sloping front face having grooves therein, said front face having a toe portion, a heel portion, and at its base a lower leading edge, said face being generally perpendicular to a target line that passes through the geometric center of the club face, said face having a face height of at least 1.40 inches, and an integral hosel segment including a bore for receiving a shaft; wherein the hosel segment is inset toward the target line from the heel portion, said face having a portion extending from the hosel in a direction opposite the geometric center generally horizontally, a perimeter wall extending rearwardly from said face portion, and the axis of said hosel bore is spaced from said heel portion a distance of at least 0.500 inches but not more than 0.562 inches.*

* * * * *

UNITED STATES PATENT AND TRADEMARK OFFICE

CERTIFICATE OF CORRECTION

PATENT NO. : RE 36950
DATED : November 7, 2000
INVENTOR(S) : Dillis V. Allen

It is certified that error appears in the above-identified patent and that said Letters Patent is hereby corrected as shown below:

Claim 18, should read --

18. A high impact golf clubhead as defined in claim 15, wherein the ball striking wall has a loft of at least 9 degrees [,perimeter weighting the body including an integral metallic perimeter wall surrounding at least a major portion of the ball striking wall and extending rearwardly therefrom forming a cavity in the rear of the clubhead with a bottom defined by the back of the ball striking wall, and means for increasing the perimeter weighting of the clubhead including an extension of the heel portion of the ball striking wall a substantial distance on the side of the hosel opposite the wall toe portion and perpendicular to the target line defining an extended heel portion and an extension of the perimeter wall around the perimeter of the extended heel portion of the ball striking wall, said hosel having an axis, said extension of the ball striking wall and said extension of the perimeter wall not being greater than 0.562 inches from the hosel axis in a direction perpendicular to the hosel axis].

Signed and Sealed this

Twentieth Day of November, 2001

*Attest:*

Nicholas P. Godici

NICHOLAS P. GODICI

*Attesting Officer*

*Acting Director of the United States Patent and Trademark Office*

UNITED STATES PATENT AND TRADEMARK OFFICE

CERTIFICATE OF CORRECTION

PATENT NO. : RE 36,950
DATED : November 7, 2000
INVENTOR(S) : Dillis V. Allen

It is certified that error appears in the above-identified patent and that said Letters Patent is hereby corrected as shown below:

Column 13,
Beginning at line 15, please amend Claim 22 as follows:
-- 22. A high impact golf clubhead, comprising: a metallic body having a substantially flat high impact ball striking wall on one side thereof angularly related to a vertical plane to provide clubhead loft, said ball striking wall having a plurality of generally parallel grooves therein and a face height of at least 1.40 inches, said ball striking wall having a substantially uniform thickness, said ball striking wall having a heel portion and a toe portion, said body having an integral hosel for receiving one end of a club shaft, means for perimeter weighting the body including an integral metallic perimeter wall surrounding at least a major portion of the ball striking wall and extending rear-wardly therefrom forming a cavity in the rear of the clubhead with a bottom defined by the back of the ball striking wall, and means for increasing the perimeter weighting of the clubhead including an extension of the heel portion of the ball striking wall a substantial distance on the side of the hosel opposite the toe portion and perpendicular to the target line defining an extended heel portion and an extension of the perimeter wall around the perimeter of the extended portion of the ball striking wall, said hosel having an axis, said extension of the ball striking wall and the axis of said hosel bore is spaced from said heel portion a distance of at least 0.500 inches but not more then 0.52 inches. --

This certificate supersedes Certificate of Correction issued August 13, 2002.

Signed and Sealed this

Fourteenth Day of September, 2004

JON W. DUDAS
*Director of the United States Patent and Trademark Office*